United States Patent
Netz et al.

(10) Patent No.: US 11,194,144 B2
(45) Date of Patent: Dec. 7, 2021

(54) MICROSCOPY METHOD USING TEMPORAL FOCUS MODULATION, AND MICROSCOPE

(71) Applicant: Carl Zeiss Microscopy GmbH, Jena (DE)

(72) Inventors: Ralf Netz, Jena (DE); Thomas Kalkbrenner, Jena (DE); Tiemo Anhut, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 447 days.

(21) Appl. No.: 16/310,870

(22) PCT Filed: Jun. 21, 2017

(86) PCT No.: PCT/EP2017/065268
§ 371 (c)(1),
(2) Date: Dec. 18, 2018

(87) PCT Pub. No.: WO2017/220668
PCT Pub. Date: Dec. 28, 2017

(65) Prior Publication Data
US 2020/0310095 A1    Oct. 1, 2020

(30) Foreign Application Priority Data

Jun. 24, 2016 (DE) .......................... 102016211374.7

(51) Int. Cl.
*G02B 21/00* (2006.01)
*G01N 21/64* (2006.01)

(52) U.S. Cl.
CPC ..... *G02B 21/0076* (2013.01); *G01N 21/6458* (2013.01); *G02B 21/006* (2013.01);
(Continued)

(58) Field of Classification Search
CPC ............ G02B 21/0076; G02B 21/0032; G02B 21/006; G02B 21/0068; G02B 21/0072;
(Continued)

(56) References Cited

U.S. PATENT DOCUMENTS

2014/0367590 A1* 12/2014 Walla ................... G02B 21/16
250/459.1
2015/0116807 A1* 4/2015 Anhut ................ G02B 21/0068
359/238

FOREIGN PATENT DOCUMENTS

DE   10 2011 013 613      4/2012
EP        1 861 742       12/2007
(Continued)

OTHER PUBLICATIONS

Watanabe et al., Generation of doughnut-shaped beam using a spiral phase plate, Review of Scientific Instruments, vol. 75, 5131-5135, Nov. 10, 2004 (Year: 2004).*

(Continued)

*Primary Examiner* — Derek S. Chapel
*Assistant Examiner* — Adam W Booher
(74) *Attorney, Agent, or Firm* — Haug Partners LLP

(57) ABSTRACT

A microscopy method, and related microscope, including producing illumination radiation and directing it at a focus. The illumination radiation is switched temporally between at least two modes, such that focus modulation is effected at which temporally varying and mutually different mode fields of the illumination radiation are produced in the focus. The focus is guided at least over regions of a sample to be examined, wherein detection radiation in the sample is or may be brought about by the illumination radiation in the focus at least at a point of origin. The detection radiation is captured in a manner assigned to the at least one point of origin. In addition to the illumination radiation, at least one disexcitation beam of rays of disexcitation radiation is directed at the focus. The disexcitation radiation prevents the detection radiation from being brought about in the region that is illuminated by the disexcitation radiation.

7 Claims, 4 Drawing Sheets

(52) U.S. Cl.
CPC ..... G02B 21/0032 (2013.01); G02B 21/0068 (2013.01); G02B 21/0072 (2013.01)

(58) Field of Classification Search
CPC .............. G02B 21/002; G02B 21/0024; G02B 21/0052; G02B 21/008; G02B 21/0084; G02B 21/0092; G02B 21/16; G02B 21/365; G02B 21/367; G01N 21/6458
See application file for complete search history.

(56) References Cited

FOREIGN PATENT DOCUMENTS

| EP | 2 437 096 | 4/2012 |
|---|---|---|
| WO | WO 2010/133678 | 11/2010 |
| WO | WO 2013/083665 | 6/2013 |
| WO | WO 2013/170940 | 11/2013 |

OTHER PUBLICATIONS

Notification of Transmittal of Translation of the International Preliminary Report on Patentability dated Jan. 3, 2019 for application No. PCT/EP2017/065268.

Züchner et al., "Light Microscopy with Doughnut Modes: A Concept to Detect, Characterize, and Manipulate Individual Nanoobjects", Angew. Chem. Int. Ed. 2011, 50, 5274-5293, DOI: 10.1002/anie. 201005845.

German Search Report for Application No. 10 2016 211 374.7 dated Dec. 19, 2016.

Search Report and Written opinion for Application No. PCT/EP2017/065268 dated Dec. 12, 2017.

\* cited by examiner

Position in focal plane

- Prior art -

Position in focal plane

- Prior art -

MICROSCOPY METHOD USING TEMPORAL FOCUS MODULATION, AND MICROSCOPE

The present application claims priority from International Patent Application No. PCT/EP2017/065268 filed on Jun. 21 2017, which claims priority from German Patent Application No. 10 2016 211 374.7 filed on Jun. 24, 2016, the disclosures of which are incorporated herein by reference in their entirety.

FIELD OF THE INVENTION

It is noted that citation or identification of any document in this application is not an admission that such document is available as prior art to the present invention.

The invention relates to a microscopy method using temporal focus modulation and a microscope for performing the same.

The temporal focus modulation (FMM) is characterized by a fast switching of different focus fields. In focus modulation, the phase position and/or the polarization of the illumination radiation is/are modulated, for example shifted or rotated.

The focus modulation is applicable in particular when the illumination radiation is to be influenced only in the focus of an objective. At the same time, any occurring background radiation is to be discriminated.

DE 10 2011 013 613 A1 discloses a microscope and microscopy method, in which at least one illumination beam is phase modulated with a modulation frequency, and the illumination beam is focusable or focused into a sample using an objective. Via a detection beam path and using a means for demodulation, detection radiation brought about in the sample is captured. In the beam path of the illumination radiation, at least one polarization-changing element is provided, arranged downstream of which is a phase plate which has at least two regions with different phase influence. The sample is illuminated with the illumination beam, wherein the illumination beam is split in alternation over at least two beam paths. In one of the beam paths, a field mode different with respect to the other beam path is produced. The different field modes are superimposed on the two beam paths in the focus. The detection radiation is demodulated in the detection beam path.

A microscope and a microscopy method using focus modulation are also known from WO 2013/170940 A1. Beyond the features already cited with respect to DE 10 2011 013 613 A1, the illumination beam is present in the form of a pulsed illumination beam and is split in the illumination beam path upstream of the objective using a first polarization beam splitter into at least a first and second partial beam path having different light paths. Using a second pole splitter, the partial beam paths are reunited, wherein provided in one of the partial beam paths is a phase element that has at least two regions with different phase influence.

SUMMARY OF THE INVENTION

The invention is based on the object of proposing a developed microscopy method with improved resolution and a microscope having improved resolution capability compared to the prior art.

When performing the microscopy method, illumination radiation is produced. The illumination radiation is modulated and directed at a focus. The modulated illumination radiation is here temporally switched between at least two modes, such that a focus modulation is effected in which fields with mutually different modes of the illumination radiation are temporally produced in the focus.

The microscopy method is characterized in that the focus is formed in the shape of a point within the meaning of a diffraction-limited Airy disk, also referred to as a spot, and is guided at least over regions of a sample to be examined, wherein detection radiation in the sample is or may be brought about by the illumination radiation in the focus at least at a point of origin and the detection radiation is captured in a manner assigned to the at least one point of origin. In addition to the illumination radiation, at least one beam of rays of disexcitation radiation is directed at the focus, wherein the bringing about of the detection radiation in the region that is illuminated by the disexcitation radiation is completely or substantially prevented by the disexcitation radiation.

In an advantageous embodiment, the focus is scanned over the sample, as a result of which at least regions of the sample are illuminated completely or in an intended pattern.

It is advantageous if the detection radiation is emitted radiation, originating for example from fluorophores, for example fluorescent molecules.

The point of origin of the detection radiation is determined by the focus position present at a capture time at which the respective detection radiation is captured. In addition, the point of origin is determined by the focus depth, that is to say the depth of the focus in the sample.

The term detection radiation is also used in this description for variants of the microscopy method in which detection radiation in the form of reflected and/or emitted radiation is prevented in the focus due to the effect of the illumination radiation, and non-occurrence of the detection radiation in the focus is captured and assigned to the point of origin, as occurs in what is known as negative imaging for example using the RESOLFT method (reversible saturable optical fluorescence transitions).

To produce focus modulation, the presence and/or the form of a property, for example the emission of fluorescence radiation, which is generated entirely or substantially in the focus, is temporally influenced such that this property is not modulated outside of the focus.

The focus modulation can be effected by fast switching of the optical phase in the pupil of an objective, as is known to a person skilled in the art. Here, the phase was switched in two half pupils. Similar to half-pupil switching, it is also possible to advantageously use the switching between the optical phases of other partial beams in the pupil to produce the focus modulation.

Known from the prior art, for example from WO 2013/170940 A1, is temporal switching between two focus states (modes), which effect modulation of the fluorescence only in the focus.

By way of example, FIG. 1 illustrates an example in accordance with the prior art for two modes in a focus in cross section, between which switching is possible. One of the modes has a zero on the optical axis. The zero disappears outside the focus.

Known in addition to pure phase switching in the pupil is switching of the polarization in combination with a phase plate to modulate the radiation coming from the focal volume. FIG. 2 illustrates an example in accordance with the prior art, in which focus modulation on the basis of an electro-optic polarization rotator or an electro-optic modulator (EOM). The focal volume is the volume in which the illumination radiation is focused.

Due to the advantageous high modulation frequencies, quickly switching optoelectronic elements such as AOMs (acousto-optic modulators) and EOMs are generally suitable. It is possible using these elements to temporally very quickly switch the polarization, as a result of which polarization-dependent phase deviations are introduced in different spatial regions, preferably in an objective pupil.

It is thus possible to attain a switch of the phases of the radiation due to a switch of the polarization state of radiation, in particular illumination radiation. With these solutions it is possible for a property of the radiation to be modulated which in the end substantially affects a (partial) field in the focus, i.e. is modulated while the major out-of-focus components are not significantly modulated.

Possible embodiments of a phase plate and those known from the prior art, which result in a focus modulation, are illustrated in FIG. 3.

The invention is based on the consideration that the techniques of FMM permit modulation frequencies of several MHz.

According to the invention, the focus modulation is integrated in a method by way of which advantageously imaging with a high resolution is achieved.

Advantages of the microscopy method according to the invention are an increase in the penetration depth, i.e. a possible greater depth of the focus.

In the case of FMM, parts of the excitation laser beam are phase modulated (laterally) with respect to other parts of the excitation beam. When focusing by way of a microscope objective, said spatial phase modulation results in an intensity modulation in the focal volume. This results from the fact that a "flat phase profile," i.e. a lateral phase that is nearly constant over the pupil, has the result that the PSF (point spread function) adopts a diffraction-limited lateral extent in the focal plane. Lateral phase profiles, on the other hand, produce a PSF having a greater spatial extent. For example, a pi-phase jump of a half pupil with respect to the other half pupil results in a stripe with the intensity zero in the focus, and in the entire light cone toward the focus. On the other hand, the PSF is more expanded in the perpendicular direction than the diffraction-limited PSF with a flat phase. In confocal microscopy, the effective PSF is the product of illumination PSF and detection PSF. The detection PSF in turn depends on the pinhole size. The now temporally and spatially varying intensity distribution of the excitation has the result that the intensity after the pinhole varies with the frequency of the excitation modulation. This intensity modulation can be captured after the confocal pinhole for example by way of lock-in detection.

The advantage of the method is that only the ballistic, that is to say non-scattered, or weakly scattered photons contribute to this modulation signal to the extent that they produce a modulation of the light distribution in the focus which then results in a temporal intensity modulation of the signal photons; the photons which are repeatedly scattered e.g. in strongly scattering media lose the fixed phase relationship and do not contribute to the time-dependent interference structure in the focus. Accordingly, the scattered excitation photons do not contribute to the lock-in-demodulated signal (however, the signal photons which are emitted by the sample in the focus and are possibly scattered can indeed contribute to the signal), and as a result, the background is strongly reduced due to scattered light (both in excitation and in detection) and the depth at which a relatively accurate imaging of the sample is possible using a laser confocal microscope is consequently increased.

If the microscopy method according to the invention is performed by guiding the focus in a scanning fashion over the sample or at least over regions of the sample, the increased penetration depths are attainable without any need to reduce the scanning speed.

In a further possible refinement of the method, the scanning speed can be increased further by achieving parallelization of the scanning process using multispot microscopy.

A modulation with modulation frequencies under the abovementioned MHz range is possible in further refinements of the method and can be correspondingly selected and set.

The illumination radiation is guided and focused as at least one illumination beam of rays.

The microscopy method in one possible variant is configured such that a modulation of the illumination radiation is modulated over the cross section of the illumination beam of rays, as a result of which a small cross-sectional area of the illumination beam of rays can be realized.

The illumination radiation and the disexcitation radiation can be directed into the focus with spatial distributions which deviate from one another, wherein the illumination radiation and the disexcitation radiation can regionally overlap.

This possibility is advantageous for example when the focus modulation is integrated in a RESOLFT method, in particular in a STED method (stimulated emission depletion), wherein the STED method is here regarded as a specific variant of the RESOLFT method.

STED and RESOLFT methods are high-resolution point-scanning methods, by way of which a resolution below the Abbe resolution limit is achieved.

The focus modulation in one possible refinement of the microscopy method is used to move a molecule that is excitable by way of the illumination radiation, in particular a molecule of the sample, from a ground state to an excited state.

In a further possible refinement of the microscopy method, the focus modulation is used to stimulate a molecule which has been moved to the excited state using the illumination radiation to emit the detection radiation. What is known as stimulated emission is brought about. The fluorescence radiation emitted here can be captured as detection radiation.

In a further refinement it is possible that the focus modulation is used to set an activation state of a molecule of the sample that is settable by way of the illumination radiation. The molecule can here be moved from an activated state to a deactivated state, and vice versa.

The molecule is for example capable of fluorescence in an activated state. After excitation has taken place, the thus activated molecule is able to be moved from a ground state to an excited state with a greater energy than the ground state. The molecule can return to the ground state from the excited state by way of spontaneous emission or stimulated emission.

The method according to the invention in a further refinement can comprise an additional illumination step, in which a further disexcitation beam of rays is produced, is directed at the sample region, and any detection radiation present is captured. The illumination of the sample region with the further disexcitation beam of rays takes place with a temporal offset after the illumination with the first disexcitation beam of rays. The temporal offset is here such that the emission of detection radiation due to the currently excited sample regions, for example due to fluorophores which have been excited here, has already subsided and only undesired detection radiation of incompletely disexcited sample regions and/or spontaneously (newly) excited sample regions occurs. The undesired detection radiation is captured and used to correct the captured detection radiation which has been disexcited with the first disexcitation beam of rays. In this way, a first image obtained by way of the captured detection radiation after the illumination with the first disexcitation beam of rays can be corrected by subtracting from the first image a further image obtained by way of the captured detection radiation after the illumination with the further disexcitation beam of rays. Advantageously, this procedure is used to eliminate a major portion of the image data that merely reproduce captured background noise.

The object is further by way of a microscope having a first radiation source for providing illumination radiation, an optical mode switch in the beam path of an illumination beam of rays of the illumination radiation for the temporal modulation thereof and switching between at least two modes, a focusing optical unit for focusing the illumination beam of rays in a focus, and a capturing unit for capturing detection radiation coming from a point of origin in the focus at a capture time the focusing optical unit is configured for focusing the illumination beam of rays in a focus, means are provided for the controlled guidance of the focus at least over regions of a sample to be examined, and the capturing unit is configured for assigning the detection radiation captured at a capture time to a point of origin of the detection radiation in the sample. Furthermore provided is a second radiation source for providing disexcitation radiation, wherein the disexcitation radiation is directed or directable, together with the illumination radiation, at the focus.

The second radiation source is configured, possibly together with optical elements arranged downstream of the second radiation source, for providing circularly polarized light as disexcitation radiation.

The optical mode switch is formed for example by an optical modulator and/or a phase element.

The optical modulator is, for example, an acousto-optic modulator (AOM), an acousto-optic tunable filter (AOTF) or an electro-optic modulator (EOM).

The phase element is embodied for example in the form of a phase plate having differently polarization-changing regions.

The phase element is arranged preferably in an objective pupil.

In a further possible embodiment, the microscope has at least one means for demodulation of the detection radiation, in particular in a beam path of the detection radiation (detection beam path), which is for example in the form of an electronic means, in particular of lock-in amplification.

In a further embodiment of the microscope, arranged in at least one disexcitation beam path of a disexcitation beam of rays of the disexcitation radiation is at least one beam-directing means with which the disexcitation beam of rays is directed or directable, together with the illumination beam of rays, at the focus. A beam-directing means is for example a mirror, an arrangement of a plurality of mirrors such as a micromirror array, a surface that is reflective for at least one wavelength component of incident disexcitation radiation, and/or combinations of said beam-directing means.

Arranged in the beam path of the disexcitation beam of rays in further embodiments of the microscope is at least one beam-influencing means, by way of which it is possible to set a spatial distribution of the disexcitation beam of rays in the focus. The spatial distribution of the disexcitation beam of rays is here settable in deviation from a spatial distribution of the disexcitation beam of rays in the focus.

The beam-influencing means in a possible embodiment of the microscope is a spiral phase element. Thereby a so-called donut mode of the disexcitation beam of rays is advantageously producible, in which a zero occurs around the optical axis, that is to say at the center of the disexcitation beam of rays (see also FIG. 1). Further possible beam-influencing means are top-hat phase elements and spatial light modulators (SLM).

In general, the polarization state can be temporally varied for example either in sine form or square form or in another advantageous waveform. As a result, the transition between the spatial field distributions in the focus of the microscope is influenced temporally differently.

The advantages of the microscopy method according to the invention and of the microscope according to the invention are an increase of the penetration depth due to reducing the out-of-focus scattered light, an improvement of the optical sectioning by reducing the fluorescence volume, and an increase of the optical resolution.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1A:
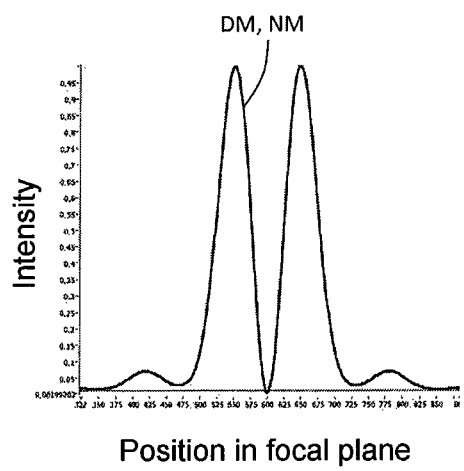
FIG. 1a shows an exemplary embodiment of the temporal focus modulation with a donut mode or a zero mode according to the prior art.
Figure 1B:
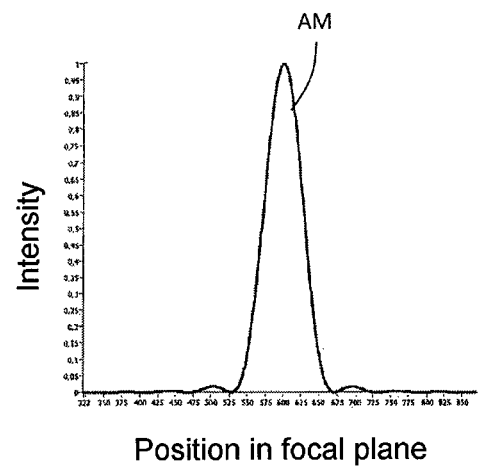
FIG. 1b shows an exemplary embodiment of the temporal focus modulation with an Airy mode according to the prior art.

FIG. 1a and FIG. 1b show temporal switching between two focus states (modes) known from the prior art.

Figure 2:
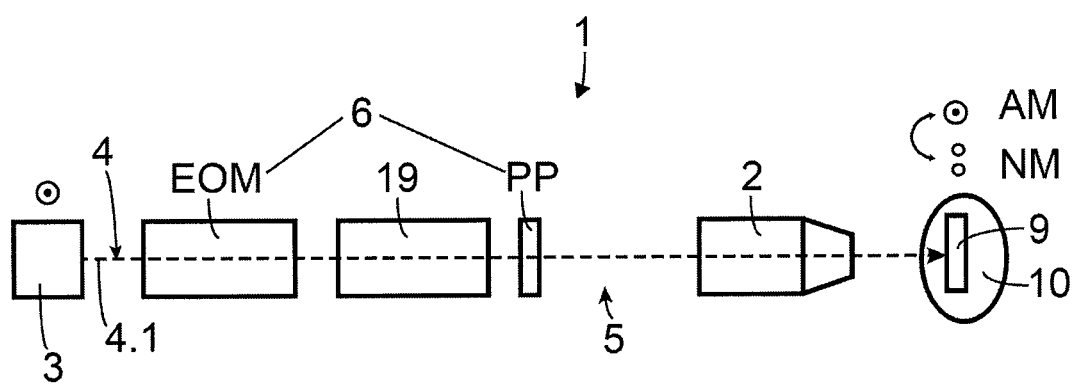
FIG. 2 shows an exemplary embodiment of a microscope configured for focus modulation in accordance with the prior art.
Figure 4:
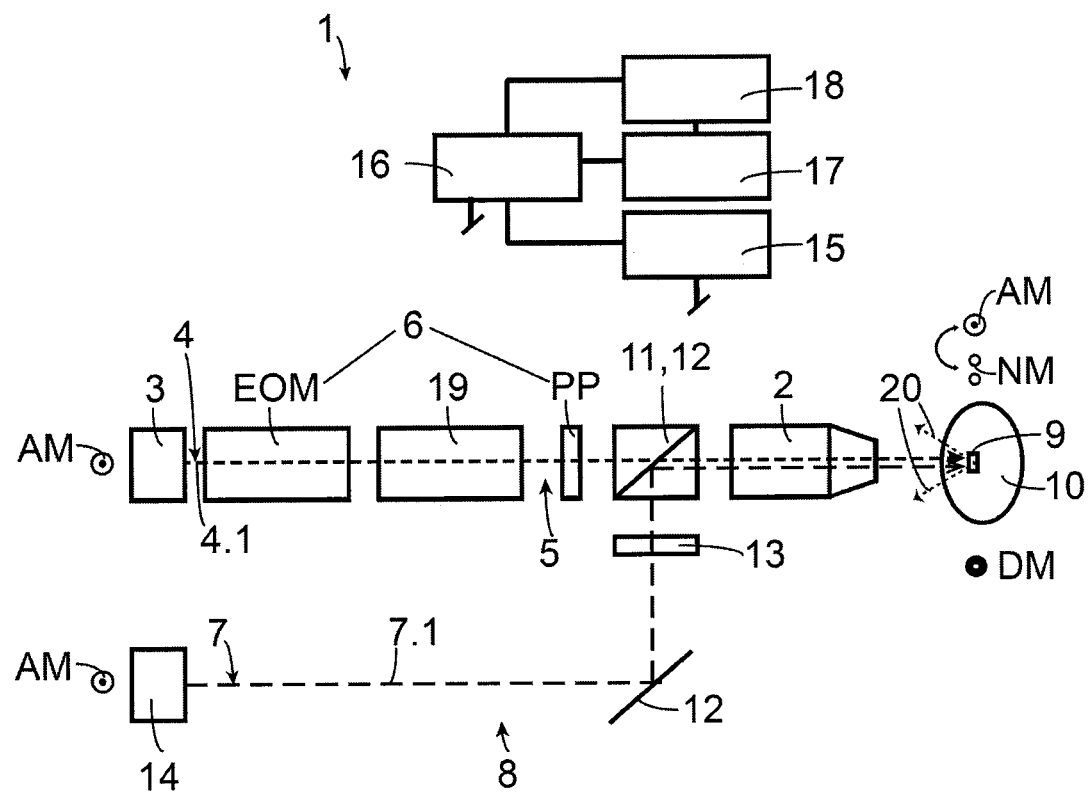
FIG. 4 shows a schematic representation of a first exemplary embodiment of a microscope according to the invention.

The cross section illustrated in FIG. 1a of a donut mode DM, or a zero mode NM, of illumination radiation 4 (see also FIGS. 2 and 4) has a zero at its center, which corresponds to the optical axis of an illumination beam of rays 5 (see FIGS. 2 and 4). Plotted on the abscissa is the respective position in the focal plane, while the ordinate indicates the associated intensity of the illumination radiation 4.

FIG. 1b shows an Airy mode AM, which is also referred to as (diffraction) disk mode.

When performing the focus modulation, modulation of the fluorescence is effected merely in one focus 9 (see FIGS. 2 and 5).

FIG. 2 schematically illustrates an exemplary embodiment of a microscope 1 known from the prior art, in particular from WO 2013/0170940 A1.

Produced by a first radiation source 3 is illumination radiation 4 with an Airy mode AM, which radiation is shaped, using an optical unit (not illustrated in more detail), as an illumination beam of rays 4.1 and guided along an optical axis (both symbolized by a dashed line). The illumination beam of rays 4.1 is modulated in an optical mode switch 6, which is formed by an electro-optic modulator EOM arranged in the illumination beam path 5 of the illumination beam of rays 4.1 and a passive phase element PP. The phase element PP is operatively connected to the electro-optic modulator EOM, which effects with corresponding driving a fast rotation of the polarization direction of the illumination radiation 4 of the incident illumination beam of rays 4.1, typically using a linearly polarized laser beam.

Provided optionally between the electro-optic modulator EOM and the phase element PP is a transmission element 19, which is for example in the form of a polarization-maintaining fiber. Alternatively, free-space beam guidance is realized, and no transmission element 19 is present.

After the illumination beam of rays 4.1 passes through the phase element PP, the illumination beam of rays 4.1 travels via a scanning unit 7 (not illustrated, see FIG. 4) to an objective 2, by means of which the illumination beam of rays 4.1 is focused in a focus 9 in a sample 10. As a consequence of a half-sided phase change on account of the phase element PP, the illumination radiation 4 of the illumination beam of rays 4.1 undergoes focus modulation.

In dependence on the current focus modulation, the illumination beam of rays 4.1 is formed in the focus 9 in the zero mode NM or in the Airy mode AM. Due to the spatial distribution of the illumination radiation 4 in the focus 9 (field), the term field modulation is also used.

Figure 3:
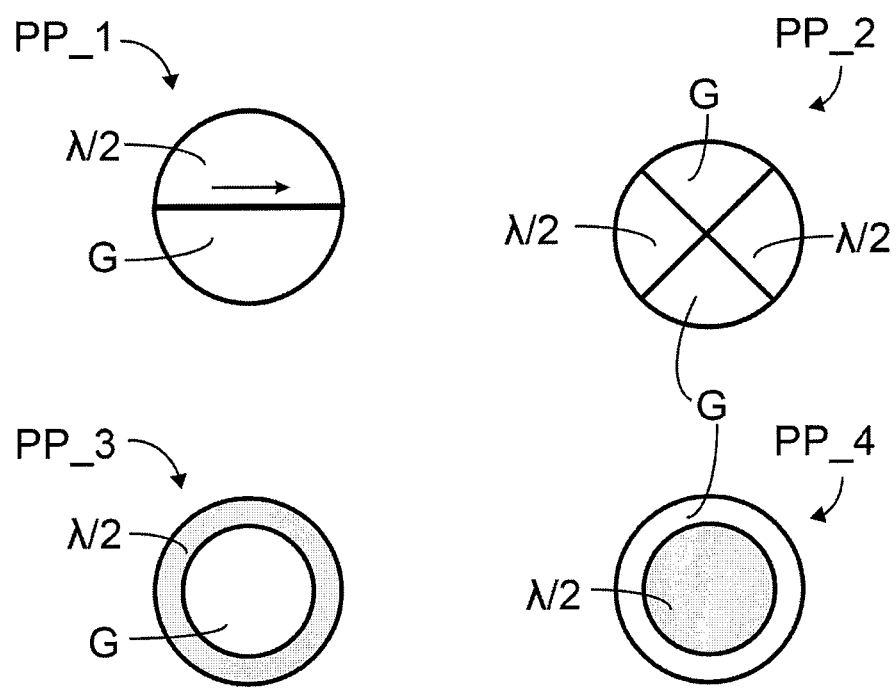
FIG. 3 shows exemplary embodiments of a λ/2 phase plate in accordance with the prior art.

The phase element PP is configured for example in the form of a phase plate, of which FIG. 3 illustrates by way of example four phase elements PP_1 to PP_4, which can also have different geometries in further embodiments.

The phase elements PP_1 to PP_4 each consist of a combination of a birefringent crystal and a component which is polarization-direction-independent with respect to the phase, for example made of glass.

Illustrated are the phase elements PP_1 to PP_4 in the form of divided phase plates, in particular as $\lambda/2$ plates. The phase plates are oriented such that the fast direction of the crystal, due to which a $\lambda/2$ change of the polarization is effected, advantageously extends parallel, perpendicular or at a further optimized angle with respect to the polarization of the illumination radiation 4 that is incident on the phase element PP.

FIG. 3 illustrates different modifications of the phase element PP. For example, realized are a half-sided division into a $\lambda/2$ region $\lambda/2$ and a region made of glass G in the first phase element PP_1, a quarter-division into opposite $\lambda/2$ regions $\lambda/2$ in the form of quarters and quarters made of glass G in the second phase element PP_2, an exterior ring-shaped $\lambda/2$ region $\lambda/2$ and a core made of glass G in the third phase element PP_3, and an exterior region made of glass G and an interior $\lambda/2$ region $\lambda/2$ (core) in the fourth phase element PP_4. Instead of glass, it is also possible to use amorphous quartz (Suprasil) or other, non-birefringent materials.

In the first phase element PP_1, the orientation of the extraordinary axis of the respective $\lambda/2$ region of the phase element PP is illustrated by way of example by an arrow. If radiation that is polarized parallel with respect to this arrow direction, for example the illumination radiation 4, passes through the first phase element PP_1, a phase shift about half a wavelength relative to the region made of glass G is produced in the $\lambda/2$ region $\lambda/2$. On the other hand, if the polarization of the radiation is oriented perpendicular with respect to the arrow direction, no relative phase delay is produced.

For example, it is also possible to use nematic crystals or structures, which produce a different polarization by way of path division. The paths are changed quickly for example by switching an AOM or an AOTF (acousto-optic tunable filter), such that the desired change in polarization occurs.

The elements illustrated in FIGS. 1 to 3 and the embodiments and refinements described in respect of FIGS. 1 to 3 can also be used for a microscope 1 according to the invention or for a microscopy method according to the invention.

FIG. 4 schematically illustrates an exemplary embodiment of a microscope 1 according to the invention.

The microscope 1 has a first radiation source 3 for providing illumination radiation 4, which is shaped into an illumination beam of rays 4.1 using an optical unit (not illustrated in more detail), for example a collimation optical unit and/or using lens elements and/or mirrors, and directed and guided along an optical axis of the microscope 1. Arranged along the optical axis are an electro-optic modulator EOM and a phase element PP in the form of a phase plate, by way of which an optical modulator 6 is formed.

Provided between the electro-optic modulator EOM and the phase element PP is a transmission element 19 in the form of a polarization-maintaining fiber.

In further embodiments of the microscope 1, only the electro-optic modulator EOM or the phase element PP is arranged. The transmission element 19 is optional, and can have a different design or be omitted in further embodiments of the microscope 1.

The optical mode switch 6 or the electro-optic modulator EOM or the phase element PP serve for temporally modulating the illumination radiation 4 of the illumination beam of rays 4.1 and the switching thereof between at least two modes. Furthermore provided is a focusing optical unit, illustrated for reasons of simplification by an objective 2, for focusing the illumination beam of rays 4.1 into a focus 9. The objective 2 is formed for focusing the illumination beam of rays 4.1 into a focus 9 or into a very small focal volume.

Furthermore provided is a second radiation source 14 for providing disexcitation radiation 7, wherein the disexcitation radiation 7, together with the illumination radiation 4, is directed at the focus 9 or directable at the focus 9.

The disexcitation radiation 7 is provided circularly polarized with an Airy mode AM using the second radiation source 14, shaped using an optical unit (not illustrated in more detail) into a disexcitation beam of rays 7.1, and directed and guided along a disexcitation beam path 8. Arranged in the disexcitation beam path 8 is a beam-directing element 12 in the form of a mirror, which is adjustable in a controlled fashion, and a beam-changing element 13 in the form of a spiral phase element. The disexcitation beam of rays 7.1 is reflected using the dichroic beam splitter 11 along the optical axis of the microscope 1 and, together with the illumination beam of rays 4.1, directed or directable along the optical axis of the microscope 1 at the focus 9.

Due to the effect of the beam-changing element 13, the mode of the disexcitation radiation 7 of the disexcitation beam of rays 7.1 is changed, in particular transferred from a Gaussian mode or an Airy mode AM to a donut mode DM.

The disexcitation radiation 7 counteracts the generation of detection radiation 20 in the focus 9. Since the disexcitation radiation 7 in the donut mode DM is directed at the focus 9, no detection radiation 20 due to the illumination radiation 4 can be brought about in the region of the ring-shaped distribution thereof about the optical axis. The detection radiation 20 is brought about using the illumination radiation 4 only in a narrowly bounded region around the optical axis, in which no disexcitation radiation 7 is directed at the focus 9, if, at a capture time, at least one atom that is excitable, or a molecule that is excitable, by the illumination radiation 4 and/or a molecule having an excitable group, for example a fluorophore, is situated in the focus 9. The point of origin of the detection radiation 20 is given by the position of such a molecule in the sample, which point of origin is captured and described by a focus position of the objective 2 and a focus depth.

For capturing the detection radiation 20 coming from a point of origin in the focus 9 at a capture time, a capturing unit 18 is provided, which is in the form of a CCD camera, a CMOS camera, or a photomultiplier tube (PMT).

The capturing unit 18 is configured for assigning the detection radiation 20 captured at a capture time to the point of origin of the detection radiation 20 in the sample 10.

The detection radiation 20 is captured via a detection beam path (not illustrated in more detail), in which a demodulator 17 is also arranged.

For the controlled guidance of the focus 9 at least over regions of a sample 10 to be examined, a scanning unit 15 is provided, which, like the demodulator 17, has a connection to a control unit 16 suitable for the exchange of data, in particular control data.

The control unit 16 is also connected to the optical modulator 6 in order to actuate at least one of the elements of the optical modulator 6.

The modulation attained by means of the focus modulation, in particular using the microscope 1 according to the invention, of illumination radiation 4 and/or disexcitation radiation 7 is utilizable in a high-resolution point-scanning method or for exciting a molecule in which the atom is raised from an energy level at a ground state S0 to an energy level of an excited state S1. The atom can jump, by way of spontaneous emission of detection radiation, from the excited state S1 to a lower energy level. The focus modulation can furthermore be used to bring about stimulated emissions of excited molecules.

If there are molecules which can be switched by way of radiation between different states, in particular between states in which the molecules are excitable or non-excitable or capable of fluorescence or not capable of fluorescence, the focus modulation can additionally or alternatively be used for switching these molecules.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE SIGNS

1 Microscope
2 Objective
3 First radiation source
4 Illumination radiation
4.1 Illumination beam of rays
5 Illumination beam path
6 Optical mode switch
7 Disexcitation radiation
7.1 Disexcitation beam of rays
8 Disexcitation beam path
9 Focus
10 Sample
11 Beam splitter
12 Beam-directing element
13 Beam-influencing element
14 Second radiation source
15 Scanning unit
16 Control unit
17 Demodulator
18 Acquisition unit
19 Transmission element
20 Detection radiation
PP Phase element
PP_1 First phase element
PP_2 Second phase element
PP_3 Third phase element
PP_4 Fourth phase element
EOM Electro-optic modulator
AM Airy mode
DM Donut mode
NM Zero mode
G Glass
$\lambda/2$ $\lambda/2$ region

The invention claimed is:

1. A microscopy method comprising:
producing illumination radiation and directing the illumination radiation at a focus, wherein the illumination radiation is modulated and switched temporally between at least two modes, such that a focus modulation is effected in which fields with mutually different modes of the at least two modes of the illumination radiation are temporally produced in the focus, wherein the focus modulation is integrated in a stimulated emission depletion (STED) method;
guiding the focus over regions of a sample to be examined,
bringing about detection radiation in the sample by the illumination radiation in the focus at least at a point of origin;
capturing the detection radiation in a manner assigned to the at least one point of origin;
in addition to the illumination radiation, directing at least one disexcitation beam of rays of disexcitation radiation at the focus;
wherein the disexcitation radiation prevents detection radiation from being brought about in a region that is illuminated by the disexcitation radiation;
producing a further disexcitation beam of rays;
directing the further disexcitation beam of rays at regions of the sample to be examined; and
capturing detection radiation;
wherein the illumination of the respective sample region with the further disexcitation beam of rays takes place with a temporal offset after the illumination with the first disexcitation beam of rays, and the temporal offset is such that emission of detection radiation due to the currently excited sample regions has already subsided and only undesired detection radiation of incompletely disexcited sample regions and/or spontaneously newly excited sample regions occurs.

2. The microscopy method as claimed in claim 1; wherein the illumination radiation is guided and focused as at least one illumination beam of rays; and wherein the illumination radiation is modulated over a cross section of the illumination beam of rays.

3. The microscopy method as claimed in claim 1; wherein the illumination radiation and the disexcitation radiation are directed at the focus with mutually deviating spatial distributions.

4. The microscopy method as claimed in claim 1; wherein the focus modulation is integrated in a reversible saturable optical fluorescence transitions (RESOLFT) method.

5. The microscopy method as claimed in claim 1, further comprising:
utilizing the focus modulation to move a molecule that is excitable by way of the illumination radiation from a ground state to an excited state.

6. The microscopy method as claimed in claim 5, further comprising:
utilizing the focus modulation to stimulate the molecule that has been moved to the excited state using the illumination radiation to emit the detection radiation.

7. The microscopy method as claimed in claim 5, further comprising:
utilizing the focus modulation to set an activation state of a molecule that is settable by way of the illumination radiation.

* * * * *